United States Patent [19]

Kimura

[11] Patent Number: 4,494,225
[45] Date of Patent: Jan. 15, 1985

[54] OPTICAL DISC REPRODUCING APPARATUS

[75] Inventor: Kenji Kimura, Tachikawa, Japan

[73] Assignee: Olympus Optical Co., Ltd., Japan

[21] Appl. No.: 365,311

[22] Filed: Apr. 5, 1982

[30] Foreign Application Priority Data

Apr. 10, 1981 [JP] Japan ................................. 56-53120

[51] Int. Cl.³ ........................ H04N 5/76; G11B 17/00
[52] U.S. Cl. ...................................... 369/44; 358/342; 358/907
[58] Field of Search ....................... 358/312, 907, 342; 360/10.1; 369/47, 44, 46

[56] References Cited

U.S. PATENT DOCUMENTS 3,911,211 10/1975 Rennick ........................ 358/907 X
3,973,080 8/1976 Dickopp et al. ................ 358/907 X
4,340,907 7/1982 Hirata et al. ...................... 369/47 X

FOREIGN PATENT DOCUMENTS 54-13216 1/1979 Japan ................................. 360/10.1

Primary Examiner—Robert L. Richardson
Attorney, Agent, or Firm—Parkhurst & Oliff

[57] ABSTRACT

In an optical video disc player, a still picture mode reproduction is effected by returning a light spot on a disc by one track pitch in its radial direction after each revolution of the disc. The displacement of the light beam is carried out by supplying a returning signal to a moving coil coupled with an objective lens. An amplitude of the returning signal is automatically adjusted by means of a negative feedback loop to such a value that the light spot is shifted accurately by one track pitch. The negative feedback loop includes an envelope detector for detecting a descent of a reproduced signal, a sampling pulse generator for producing a sampling pulse in response to a first descent during the displacement of the light spot, a pulse generator for producing a returning pulse having a constant amplitude, a sawtooth generator actuated by the returning pulse to produce a sawtooth signal, a phase comparator for sampling the sawtooth signal by the sampling signal to produce a control signal and a pulse level modulator for modifying the level of the returning pulse with the control signal.

10 Claims, 15 Drawing Figures

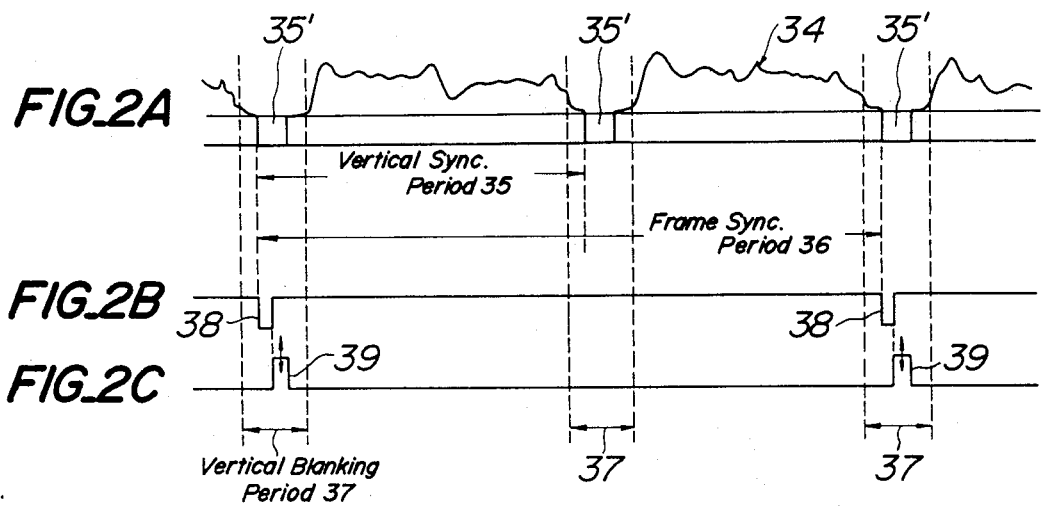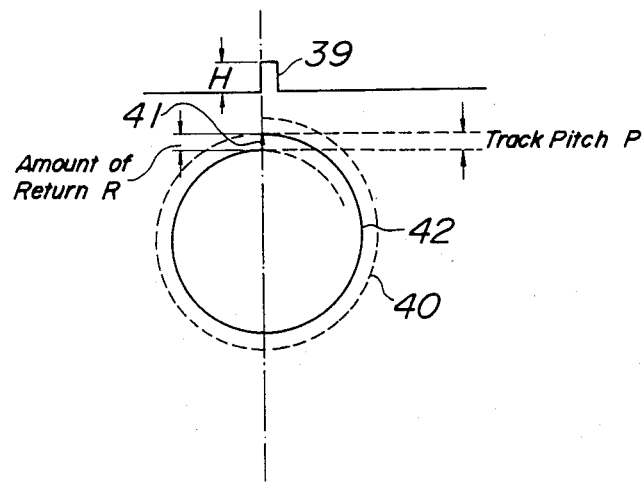

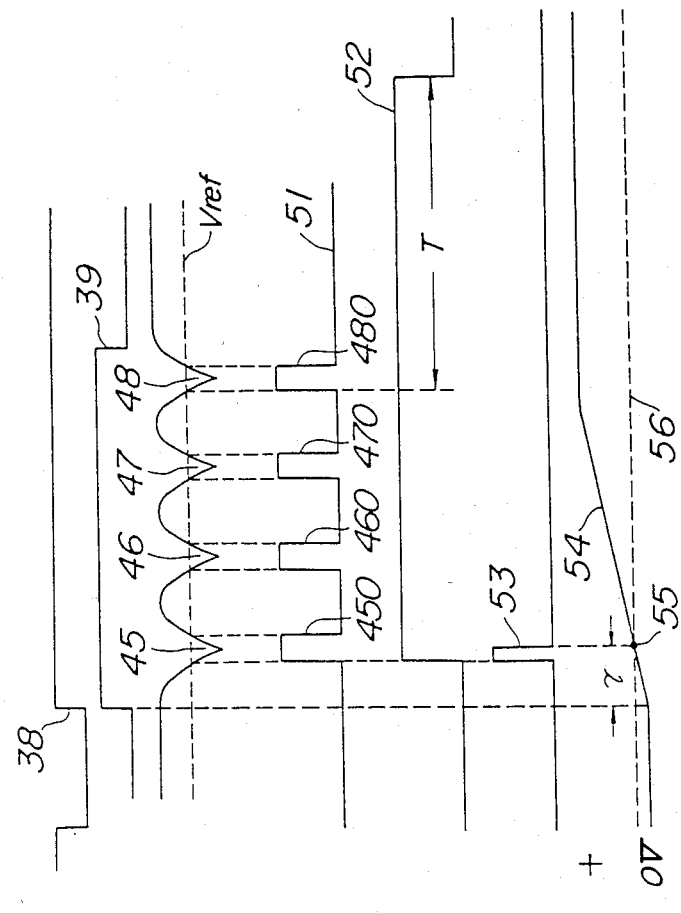

OPTICAL DISC REPRODUCING APPARATUS

BACKGROUND OF THE INVENTION

The present invention relates to an apparatus for reproducing an information signal recorded on an optical disc along spiral or concentric tracks comprising a light source for producing a light beam, an optical system for focusing the light beam onto the optical disc as a light spot, a light detector for receiving the light beam modulated in accordance with the information signal recorded on the disc to produce a reproduced signal, means for rotating the disc at a given revolving speed, and means for returning the light spot on the disc by one track pitch after every revolution of the disc so as to effect a special mode reproduction such as slow motion and still picture mode reproduction.

In a video disc, a video signal is so recorded that successive frame signals are recorded in successive tracks. In order to effect a still picture mode reproduction, the beam spot must be moved backward by one track pitch in a stepwise manner in synchronism with a frame synchronizing signal so as to cause the beam spot to trace the same track repeatedly. For effecting the still picture reproduction accurately, the beam spot should be returned precisely by one track pitch. This may be effected by rotating a movable mirror by a small angle or by shifting an objective lens in a tracking direction substantially perpendicular to an optical axis of the lens as well as to a track direction. However, in practice, it is very difficult to return the beam spot accurately by one track pitch by means of an electro-mechanical mechanism for driving the mirror or lens. That is to say although a given control amount required for moving the beam spot by one track pitch has been previously set, an actual amount of displacement of the beam spot might be fluctuated due to a mechanical tracking property of the driving mechanism. In general, the mechanical tracking property might be subjected to temperature drift and secular variation and thus, the control amount required for moving the spot by one track pitch might be fluctuated. If the driving mechanism is so constructed as to avoid such a fluctuation, the driving mechanism must be complicated and is liable to be expensive to a great extent.

SUMMARY OF THE INVENTION

The present invention has for its object to provide an apparatus for reproducing an information signal recorded on an optical disc along spiral or concentric tracks, in which the beam spot can be returned accurately by one track pitch in a simple and inexpensive manner without being affected by fluctuation of the driving mechanism due to temperature drift and secular variation.

It is another object of the invention to provide an optical disc reproducing apparatus in which a control amount for the beam spot displacing means can be automatically adjusted in accordance with an actual amount of the displacement of the beam spot.

According to the invention, in an apparatus for reproducing an information signal recorded on an optical disc along spiral or concentric tracks comprising means for emitting a light beam, means for focusing the light beam onto the optical disc as a light spot, means for rotating the optical disc at a given speed, means for receiving the light beam modulated in accordance with the information signal to produce a reproduced signal, means for producing a returning signal, and means for moving the light spot on the optical disc in its radial direction by one track pitch in response to said returning signal so as to trace the same and single track repeatedly to effect a special mode reproduction such as still picture reproduction and slow motion picture reproduction, the improvement comprises:

means for receiving the reproduced signal to detect a first signal representing the actual movement of the light spot with respect to the tracks;

means for receiving said first signal to detect a control amount required for returning the light spot by one track pitch; and means for adjusting a magnitude of said returning signal in accordance with said control amount.

BRIEF DESCRIPTION OF THE DRAWINGS

FIGS. 2A, 2B and 2C are signal waveforms for explaining the operation of the apparatus shown in FIG. 1;

FIG. 3 is a schematic view explaining the operation for returning beam spot by one track pitch;

FIGS. 5A to 5G are signal waveforms for explaining the manner of controlling the level of the returning pulse according to the invention.

DESCRIPTION OF THE PREFERRED EMBODIMENTS

Figure 1:
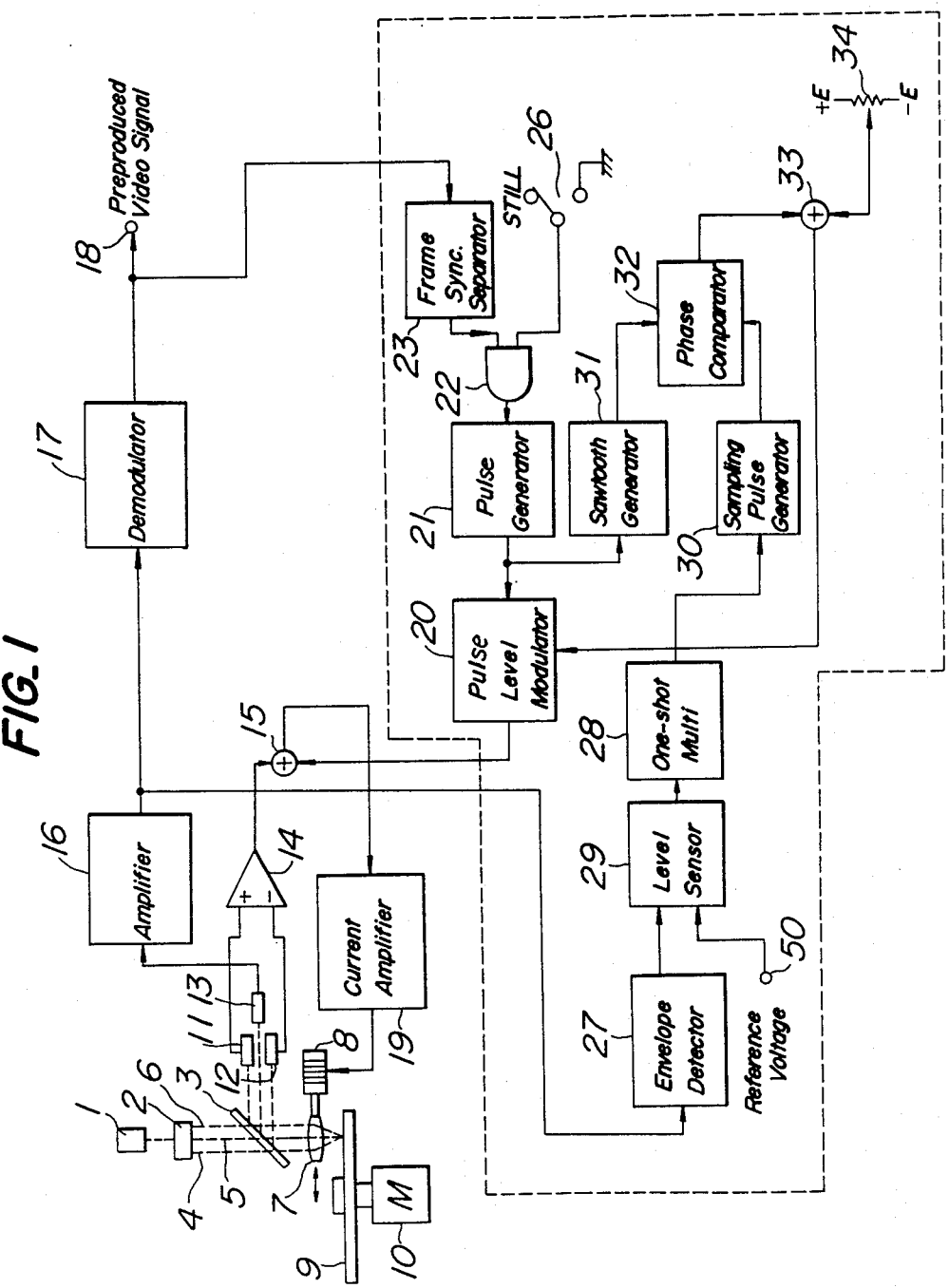
FIG. 1 is a block diagram showing an embodiment of the optical disc reproducing apparatus according to the invention.

FIG. 1 is a block diagram showing an embodiment of the optical disc reproducing apparatus according to the invention. A laser light beam emitted from a laser light source 1 is made incident upon a beam splitter 2 and is divided into three beams 4, 5 and 6. These beams are transmitted through a half mirror 3 and are focused by an objective lens 7 onto an optical disc 9 as three light spots. The disc 9 is rotated by a motor 10 at a given constant speed such as 1,800 rpm. The three beam spots are so projected upon the disc 9 with respect to a spiral or concentric track that a central spot traces a center of the track and both side beam spots scan both side edges of the same track. The light beams reflected by the disc 9 are collected by the objective lens 7 and the central beam is made incident upon a light detector 13 and the side beams are made incident upon light detectors 11 and 12. Output signals of the light detectors 11 and 12 are supplied to a differential amplifier 14 to produce a tracking error signal. An output signal from the light detector 13 is supplied through an amplifier 16 to a demodulator 17. An output signal from the demodulator 17 is supplied to an output terminal 18 as a reproduced video signal. An output signal from the differential amplifier 14 is supplied via a mixer 15 to a current amplifier 19 and an output signal from the amplifier 19 is supplied to a moving coil 8 as a tracking control signal. The moving coil 8 is coupled with the objective lens 7 and the tracking control is effected by moving the moving coil 8 and the objective lens 7 in a tracking direction perpendicular to an optical axis of the objective lens 7 as well as to a track direction. The tracking control mentioned above is generally called a three beam method and the main beam 5 can be always positioned on the center of the track.

According to the invention, in order to effect a slow motion picture reproduction and/or a still picture reproduction, there is provided a control circuit enclosed by a dotted line. The reproduced video signal from the demodulator 17 is supplied to a frame synchronizing signal separator 23. A frame synchronizing signal (pulse) separated from the video signal by the separator 23 is supplied through an AND circuit 22 to a pulse generator 21 as a triggering pulse. An output pulse from the pulse generator 21 is supplied to a pulse level modulator 20 and is modified or adjusted into a pulse having a given level. The pulse having the adjusted level is supplied to the mixer 15 and is mixed with the tracking control signal of the tracking control mechanism. This pulse is used to return the objective lens 7 in the tracking direction by such an amount that the beam spot is shifted backward by one track pitch. The returning pulse is in synchronized with the frame synchronizing signal as illustrated in FIG. 2 and thus, the returning operation is effected during a vertical blanking period. Therefore, any transient due to the returning operation does not appear in a reproduced image. In the present embodiment, the returning operation has been finished within about 200μ seconds.

FIG. 2A shows the reproduced video signal 34 including the vertical synchronizing signal 35'. A reference numeral 35 denotes a period of the vertical synchronizing signal 35' and 36 indicates a period of the frame synchronizing signal. FIG. 2B shows the frame synchronizing signal 38 separated by the frame synchronizing signal separator 23. Further, FIG. 2C illustrates the returning pulse 39 produced from the pulse level modulator 20. The returning pulse 39 appears in the vertical blanking period 37. As indicated by a double-headed arrow, according to the invention the level of the returning pulse 39 is adjusted.

FIG. 3 is a diagram showing the returning operation by means of the returning pulse 39. In FIG. 3, a reference numeral 40 denotes a track formed in the disc 9 spirally. The disc is scanned by the beam spot from the outside to the inside. The beam spot is returned outwardly as shown by an arrow 41 by means of the returning pulse 39 by the track pitch and thus, the same and single turn of the track 42 is repeatedly traced by the beam spot. In this manner, the still picture mode reproduction can be effected. If each of successive track turns is traced repeatedly several times, the slow motion picture mode reproduction may be carried out. The amount of return R is determined by an amount, i.e. amplitude H of the returning pulse 39. According to the present invention the amplitude H of the returning pulse 39 is automatically adjusted so that the amount of return R of the beam spot is made always equal to the track pitch P.

Figure 4A:
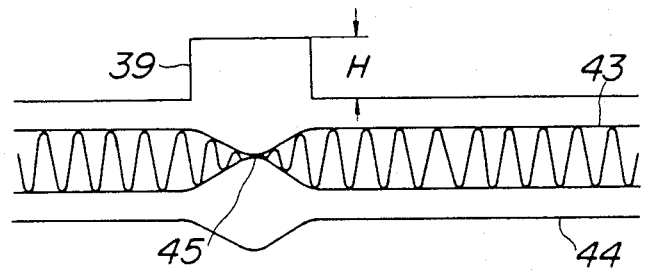
FIGS. 4A, 4B and 4C are signal waveforms for explaining a relationship between a level of a returning pulse and a reproduced RF signal.

FIG. 4A illustrates an ideal case in which the beam spot is displaced backward accurately by one track pitch P. In this case, the reproduced RF signal 43 supplied from the amplifier 16 becomes zero as shown by a reference numeral 45, when the beam spot is moved radially and is made incident upon a portion between adjacent tracks, in which portion no pit information is recorded. In the ideal case, such a descent of the RF signal 43 appears only once during the returning operation of the beam spot. In FIG. 4A, an envelope of the reproduced RF signal is also shown by a reference numeral 44.

Figure 4B:
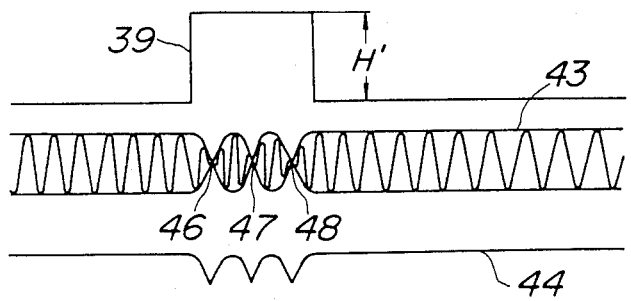

FIG. 4B illustrates a case in which the returning pulse 39 has a too large amplitude H'. In such a case, since the beam spot is moved across a plurality of tracks during the returning period and thus the RF signal 43 has several descents. In FIG. 4B, the beam spot is moved over three tracks and thus, three descents 46, 47 and 48 appear in the reproduced RF signal 43. It should be noted that when the level of the returning pulse is high, the beam spot is moved at a higher speed.

Figure 4C:
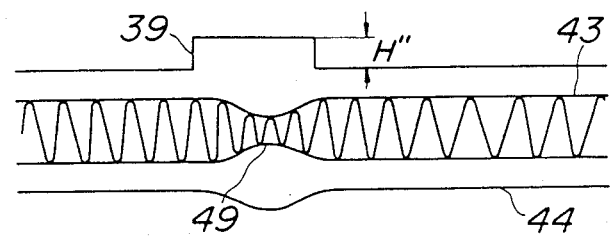

FIG. 4C depicts a case in which the amplitude H" of the returning pulse 39 is too small to displace the beam spot over one track pitch P. In this case, the RF signal 43 does not show a steep decrease as shown by a reference numeral 49.

As can be seen from the above, in order to return the beam spot accurately by one track pitch P, it is necessary to adjust the level or amplitude of the returning pulse 39 to the desired value H. However, in practice, even if the level of the returning pulse is made always equal to the constant value H, the beam spot could not be moved accurately by one track pitch P due to the fact that the mechanical tracking property of the tracking mechanism might fluctuate in dependence upon a temperature drift and secular variation. According to the invention, a relationship between the amount of the displacement and the level of the returning pulse is always detected or monitored and the level of the returning pulse is automatically controlled in accordance with the detected relationship to such a value that the beam spot is moved accurately by one track pitch P under any condition.

As shown in FIG. 1, the output pulse from the pulse generator 21 is also supplied to a sawtooth signal generator 31 to trigger it. A sawtooth signal produced by the generator 31 is supplied to one input of a phase comparator 32, to the other input of which is supplied an output pulse from a sampling pulse generator 30, so that at an output of the phase comparator 32 is produced a sampled and held voltage. The reproduced RF signal from the voltage amplifier 16 is applied to the envelope detector 27 to produce the envelope signal 44 shown in FIGS. 4A, 4B and 4C. The envelope signal 44 thus detected is supplied to one input of a level sensor 29, to the other input of which is applied a reference voltage Vref from a terminal 50. An output signal from the level sensor 29 is supplied to a retriggable one-shot multivibrator 28 as a triggering signal. An output signal from the multivibrator 28 is supplied to the sampling pulse generator 30 as a triggering signal. Further, an output from the phase comparator 32 is supplied via a mixer 33 to a control input of the pulse level modulator 20 as a modulating signal. In this manner an automatic control loop for effecting the optimum level modulation or adjustment is constructed. Moreover, the other input of the AND circuit 23 is connected to the earth through a switch 26.

Now the operation of the control circuit will be explained with reference to FIGS. 5A to 5G showing the case in which the level H' of the returning pulse 39 shown in FIG. 5B is too high. In this case, the envelope signal from the envelope detector 27 has several descents 45, 46, 47 and 48 as illustrated in FIG. 5C, but since a time constant T of the retriggable one-shot multivibrator 28 is made sufficiently long with respect to a repetition period of the successive descents as shown in FIG. 5E, only the first descent 45 is exclusively detected. As illustrated in FIG. 5D, the level sensor 29 produces four pulses 450, 460, 470 and 480 when the output signal of the envelope detector 27 becomes lower than the reference voltage Vref. The multivibrator 28 is triggered by the first output pulse 450 and its output changes from a low level to a high level as shown in FIG. 5E. Since the sampling pulse generator 30 is triggered by a raising edge of the output signal from the multivibrator 28, it produces only one sampling pulse 53 as shown in FIG. 5F. At the same time, the sawtooth signal generator 31 is triggered by a trailing edge of the frame synchronizing signal 38 shown in FIG. 5A and produces a sawtooth signal 54 as illustrated in FIG. 5G. This sawtooth signal 54 is sampled and held by the sampling pulse 53 at its trailing edge as shown by a reference numeral 55 and a voltage 56 thus held is produced from the phase comparator 32 as illustrated in FIG. 5G. It is apparent that the amplitude of this voltage 56 is proportional to a time $\tau$ related to a period from the frame synchronizing signal 38 to the first descent 45, i.e. a period during which the beam spot is moved by one track pitch P. In other words, when the level of the returning pulse 39 is too high, the sampled and held voltage 56 becomes lower, whereas when the returning pulse 39 has a too low level, the voltage 56 becomes higher. In this manner, it is possible to detect a control amount which represents the level of the returning pulse required for returning the beam spot by one track pitch. The output signal from the phase comparator 32 is applied to the pulse level modulator 20 to control the level of the returning pulse in such a manner that when the level of the voltage 56 is high, the level of the returning pulse is made lower and vice versa. In this manner a negative feedback loop is constructed to adjust automatically the level of the returning pulse to such a value that the beam spot is always moved accurately by one track pitch P. A lock-in point of this feedback loop may be suitably set by adding to the voltage supplied from the phase comparator 32 a voltage adjustable by a potentiometer 34.

When the switch 26 is driven as shown in FIG. 1, the separated frame synchronizing signal passes through the AND circuit 22 and the above mentioned still picture mode reproduction can be effected. However, when the switch 26 is changed into an opposite position, the frame synchronizing signal is inhibited by the AND circuit 22 and thus, the normal reproduction may be carried out.

As explained above in detail, according to the invention the level of the returning pulse is automatically adjusted to a value required for returning the beam spot accurately by one track pitch and thus, the still or slow motion picture mode reproduction can be effected in an accurate and stable manner without being affected by undesired fluctuation of the driving mechanism for moving the beam spot due to a variation of load to the driving mechanism, temperature variation, secular variation, etc. It should be noted that according to the invention the beam spot might be moved over several tracks initially, but after that the displacement of the beam spot is adjusted accurately to the track pitch. In this case the initial shift of the beam spot over several tracks does not cause any trouble in practical use.

The present invention is not restricted to the embodiment mentioned above, but many modifications and variations may be conceived by those skilled in the art within the scope of the invention. For instance, in the above embodiment the same and single track is repeatedly traced to effect the still picture mode reproduction, but it is also possible to reproduce the video signal in a slow motion picture mode, a reverse motion, a frame-by-frame mode. Further, in the above embodiment, the beam spot is returned by means of the moving coil connected to the objective lens, but it is apparent that the objective lens may be moved in the tracking direction by means of any other mechanism or the beam spot may be displaced by means of a swingable mirror arranged between the light source and the objective lens. Moreover, in the above explained embodiment the tracking error signal is derived with the aid of the three beam method, but any other method may be equally used such as a wobbling method. Further, the tracks may be concentric instead of spiral.

What is claimed is:

1. In an apparatus for reproducing information recorded on an optical disc as an information signal along spiral or concentric tracks wherein the apparatus includes means for emitting a light beam, means for focusing the light beam onto the optical disc as a light spot, means for rotating the optical disc at a given speed, means for moving said light spot with respect to said disc to produce a light beam modulated in accordance with the information signal in said tracks, means for receiving the modulated light beam to form a reproduced signal, means for producing a returning signal, and means for moving the light spot on said optical disc in response to said returning signal to cause said light spot to repeatedly trace a single track, the improvement in said apparatus comprising:
   means responsive to said reproduced signal for generating a first signal representing the actual movement of the light spot with respect to said tracks;
   means responsive to said first signal for generating a control signal having a value representing light spot movement by one track pitch; and
   means for adjusting the magnitude of said returning signal in response to said control signal so that said returning signal moves said light spot by one track pitch.

2. An apparatus according to claim 1, wherein said first signal generating means comprises means for detecting a decrease of the reproduced signal which decrease is produced when the light spot is projected upon an information-free portion between adjacent tracks.

3. In an apparatus for reproducing information recorded on an optical disc as an information signal along spiral or concentric tracks wherein the apparatus includes means for emitting a light beam, means for focusing a light beam onto the optical disc as a light spot, means for rotating the optical disc at a given speed, means for moving said light spot with respect to said disc to produce a light beam modulated in accordance with the information signal in said tracks, means for receiving the modulated light beam to form a reproduced signal, means for producing a returning signal, and means for moving the light spot on said optical disc in response to said returning signal to cause said light spot to repeatedly trace a single track, the improvement in said apparatus comprising:
   means responsive to said reproduced signal for generating a first signal representing the actual movement of the light spot with respect to the tracks, said means for generating said first signal comprising means responsive to a decrease in the reproduced signal caused by the light spot being projected upon an information-free area between adjacent tracks and which includes an envelope detector for detecting an envelope signal of said reproduced signal and a level sensor coupled to compare the envelope signal with a given reference value to produce said first signal when said envelope signal is less than said reference value;

means responsive to said first signal for generating a control signal having a value representing light spot movement by one track pitch; and means for adjusting the magnitude of said returning signal in response to said control signal so that said returning signal moves said light spot by one track pitch.

4. An apparatus according to claim 3, wherein said control signal generating means comprises means for detecting a time required for the light spot to move by one track pitch and means for producing the control signal proportional to the detected time.

5. An apparatus according to claim 4, wherein said time detecting means comprises a retriggable one-shot multivibrator which is triggered by said first signal to produce an output signal and a pulse generator for producing a sampling pulse in response to said output signal of the multivibrator.

6. An apparatus according to claim 5, wherein said control signal generating means comprises a sawtooth signal generator which is actuated by the returning signal to produce a sawtooth signal and a phase comparator for sampling and holding said sawtooth signal in response to said sampling pulse to produce said control signal.

7. An apparatus according to claim 6, wherein said means for adjusting the returning signal comprises a pulse level modulator for modulating a level of the returning signal with the control signal.

8. An apparatus according to any one of the preceding claims 2 and 4 to 7, wherein said returning pulse generating means comprises a circuit for separating from the reproduced signal a signal synchronized with the rotation of the optical disc and a pulse generator responsive to said synchronizing signal for producing a returning signal having a constant amplitude.

9. An apparatus according to claim 8, wherein said optical disc comprises a video signal as said information signal and said separating circuit separates a frame synchronizing pulse in a reproduced video signal.

10. In an apparatus for reproducing information recorded in tracks on a record medium wherein said apparatus includes means for emitting a light beam, means for focusing the light beam onto the record medium, means for moving said light beam and record medium relative to one another to move said focused light beam over said tracks for producing a modulated light beam representing information recorded in said tracks, means responsive to said modulated light beam for producing a reproduced signal, means for producing a return signal, and means responsive to said return signal for moving said focused light beam by at least one track to cause said light beam to retrace said track, the improvement in said apparatus comprising:

means responsive to said reproduced signal for generating a first signal representing the actual movement of the focuses light beam with respect to said tracks;

means responsive to said first signal for generating a control signal; and means responsive to said control signal for adjusting the magnitude of said return signal to cause said light beam to retrace said at least one track.

* * * * *